United States Patent
Sun et al.

(10) Patent No.: US 11,972,182 B2
(45) Date of Patent: Apr. 30, 2024

(54) METHOD FOR DYNAMIC STATE ESTIMATION OF NATURAL GAS NETWORK CONSIDERING DYNAMIC CHARACTERISTICS OF NATURAL GAS PIPELINES

(71) Applicant: TSINGHUA UNIVERSITY, Beijing (CN)

(72) Inventors: Hongbin Sun, Beijing (CN); Qinglai Guo, Beijing (CN); Bin Wang, Beijing (CN); Guanxiong Yin, Beijing (CN); Zhaoguang Pan, Beijing (CN); Binbin Chen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 590 days.

(21) Appl. No.: 17/322,912

(22) Filed: May 18, 2021

(65) Prior Publication Data

US 2021/0365619 A1    Nov. 25, 2021

(30) Foreign Application Priority Data

May 25, 2020 (CN) .......................... 202010447971.6

(51) Int. Cl.
*G06F 30/28* (2020.01)
*G06F 17/16* (2006.01)
*G06F 111/10* (2020.01)

(52) U.S. Cl.
CPC .............. *G06F 30/28* (2020.01); *G06F 17/16* (2013.01); *G06F 2111/10* (2020.01)

(58) Field of Classification Search
CPC ....... G06F 30/28; G06F 17/16; G06F 2111/10
See application file for complete search history.

(56) References Cited

U.S. PATENT DOCUMENTS

| | | | |
|---|---|---|---|
| 2015/0261893 A1 | 9/2015 | Yu et al. | |
| 2017/0193029 A1 | 7/2017 | Bennett et al. | |
| 2017/0206292 A1 | 7/2017 | Bennett et al. | |
| 2020/0080407 A1* | 3/2020 | Gunnerud | G05B 13/048 |

FOREIGN PATENT DOCUMENTS

| | | | | |
|---|---|---|---|---|
| CN | 102997045 A | | 3/2013 | |
| CN | 107817681 A | | 3/2018 | |
| CN | 108920866 A | | 11/2018 | |
| CN | 109376910 A | * | 2/2019 | ............. G06Q 10/04 |
| CN | 110765622 A | | 2/2020 | |

OTHER PUBLICATIONS

Pan Z, Guo Q, Sun H. Interactions of district electricity and heating systems considering time-scale characteristics based on quasi-steady multi-energy flow. Applied energy. Apr. 1, 2016;167:230-43. (Year: 2016).*

* cited by examiner

*Primary Examiner* — Chuen-Meei Gan

(57) ABSTRACT

Provided is a method for a dynamic state estimation of a natural gas network considering dynamic characteristics of natural gas pipelines. The method can obtain a result of the dynamic state estimation of the natural gas network by establishing an objective function of the dynamic state estimation of the natural gas network, a state quantity constraint of a compressor, a state quantity constraint of the natural gas pipeline and a topological constraint of the natural gas network, and using a Lagrange method or an interior point method to solve a state estimation model of the natural gas network. The method takes the topological constraint of the natural gas network into consideration, and employs a pipeline pressure constraint in a frequency domain to implement linearization of the pipeline pressure constraint, thereby obtain a real-time, reliable, consistent and complete dynamic operating state of the natural gas network.

1 Claim, No Drawings

METHOD FOR DYNAMIC STATE ESTIMATION OF NATURAL GAS NETWORK CONSIDERING DYNAMIC CHARACTERISTICS OF NATURAL GAS PIPELINES

TECHNICAL FIELD

The present disclosure relates to a method for a dynamic state estimation of a natural gas network considering dynamic characteristics of natural gas pipelines, belonging to the technical field of operation and control of an integrated energy system.

BACKGROUND

An integrated energy system has great advantages in terms of many aspects such as improving energy utilization efficiency, promoting new energy consumption, and reducing energy costs. It is a development trend of future energy systems. An Integrated Energy Management System (IEMS), which can regulate energy flows using information flows, is an intelligent decision-making "brain" that ensures a safe, economical, green, and highly efficient integrated energy system. The technology for estimating a state, as a basic module of the IEMS, is responsible for providing real-time, reliable, consistent, and complete operating state information, and thus it can provide the subsequent security analysis and optimization control with reliable operating data.

At present, researches on state estimations of a natural gas network are still in their infancy, not to mention state estimation technology that considers dynamic natural gas. Only some of the published literatures have proposed the dynamic state estimation methods based on Kalman filtering for a single natural gas pipeline. However, these methods fail to consider constraints of the natural gas network, and they require an initial state inside the pipeline to be known (generally assumed to be a steady state). In addition, a step of bad data identification is hard to be added to a format of an iterative solution of the Kalman filtering, which greatly limits its application. Thus, it is urgent to propose a method for a dynamic state estimation of a complex natural gas pipeline network, so as to provide sufficient data support for the operation and control of the integrated energy system.

SUMMARY

The present disclosure provides a method for a dynamic state estimation of a natural gas network considering dynamic characteristics of natural gas pipelines to obtain a real-time, reliable, consistent and complete operating state of the natural gas network, thereby overcoming the defects in the known state estimations of the natural gas network.

The method for the dynamic state estimation of the natural gas network considering the dynamic characteristic of the natural gas pipeline provided by the present disclosure includes:

step 1 of establishing a time-domain window and a frequency-domain window for the dynamic state estimation of the natural gas network, the step 1 including:

sub-step 1-1 of defining a time-domain window width as $I^t$, where $I^t$ is a positive integer, and a value of $I^t$ is determined by a dispatcher of the natural gas network; defining a u-th sampling time point in the time-domain window as $\tau_u = \tau - u\Delta t$, $u=0, 1, \ldots, I^t-1$, where $\tau$ represents a current time point of the natural gas network, and $\Delta t$ represents a sampling interval of the natural gas network; defining a current time-domain window width as $I^{t,e}$, where $I^{t,e}$ is a positive integer, and a value of $I^{t,e}$ is determined by the dispatcher of the natural gas network; and defining a historical time-domain window width as $I^{t,h}$, where $I^{t,h}$ is a positive integer, and a value of $I^{t,h}$ is determined by the dispatcher of the natural gas network, wherein $I^t$, $I^{t,e}$ and $I^{t,h}$ satisfy the following relational expression:

$$I^t = I^{t,e} + I^{t,h}; \text{ and}$$

sub-step 1-2 of defining a frequency-domain window width as $I^f$, where a value of $I^f$ is determined by the dispatcher of the natural gas network; and defining a d-th frequency component in the frequency-domain window as $\omega_d$, $d=0, 1, \ldots, I^f-1$, where $\omega_d$ is calculated by the following formula:

$$\omega_d = \frac{d}{I^t \cdot \Delta t}$$

step 2 of constructing a measurement vector for the dynamic state estimation of the natural gas network, the step 2 including:

sub-step 2-1 of acquiring, from a data acquisition and monitoring control system of the natural gas network, all operation data of the natural gas network at a sampling time point $\tau_u$ in the time-domain window where the current time point $\tau$ of the natural gas network belongs, wherein the all operation data of the natural gas network comprises: a measurement value $z_{G^+,u}^{i_p}$ of a natural gas flow at a head end of each pipeline in the natural gas network, and a measurement value $z_{G^-,u}^{i_p}$ of a natural gas flow at a tail end of each pipeline in the natural gas network, where $i_p$ represents a serial number of a pipeline in the natural gas network; a measurement value $z_{G^+,u}^{i_c}$ of a natural gas flow at a head end of each compressor, and a measurement value $z_{G^-,u}^{i_c}$ of a natural gas flow at a tail end of each compressor, where $i_c$ represents a serial number of a compressor; a pressure measurement value $z_{pr,u}^{i_n}$ of each node of the natural gas network, where $i_n$ represents a serial number of a node of the natural gas network; a measurement value $z_{gs,u}^{i_s}$ of a natural gas flow of each natural gas source, where $i_s$ represents a serial number of a natural gas source; and a measurement value $z_{gl,u}^{i_l}$ of a natural gas flow of each natural gas load, where $i_l$ represents a serial number of a natural gas load; and sub-step 2-2 of constructing a measurement vector $z_u$ for the dynamic state estimation of the natural gas network at the sampling time point $\tau_u$:

$$Z_u = \begin{bmatrix} Z_{G^+,u} \\ Z_{G^-,u} \\ Z_{pr,u} \\ Z_{gs,u} \\ Z_{gl,u} \end{bmatrix}$$

where $z_{G^+,u}$ represents a column vector consisting of all the measurement values $z_{G^+,u}^{i_p}$ of natural gas flows at head ends of respective pipelines in the natural gas network and all the measurement values $z_{G^+,u}^{i_c}$ of natural gas flows at head ends of respective compressors at the sampling time point $\tau_u$; $z_{G^-,u}$ represents a column vector consisting of all the measurement values $z_{G^-,u}^{i_p}$ of natural gas flows at tail ends of respective pipelines in the natural gas network and all the measurement values $z_{G^-,u}^{i_c}$ of natural gas flows at tail ends of respective compressors at the sampling time point: $\tau_u$; $z_{pr,u}$ represents a column vector consisting of all the pressure measurement values $z_{pr,u}^{i_n}$ of respective nodes of the natural gas network at the sampling time point $\tau_u$; $z_{gs,u}$ represents a column vector consisting of all the measurement values $z_{gs,u}^{i_s}$ of natural gas flows of respective natural gas sources in the natural gas network at the sampling time point $\tau_u$; and $z_{gl,u}$ represents a column vector consisting of all the measurement values $z_{gl,u}^{i_l}$ of natural gas flows of respective natural gas loads in the natural gas network at the sampling time point $\tau_u$;

step 3 of constructing a state vector $x_u$ for the dynamic state estimation of the natural gas network at the sampling time point $\tau_u$:

$$x_u = \begin{bmatrix} x_{G^+,u} \\ x_{G^-,u} \\ x_{pr,u} \\ x_{gs,u} \\ x_{gl,u} \end{bmatrix}$$

where $x_{G^-,u}$ represents a column vector consisting of all natural gas flows $G_{i_p,u}^+$ at the head ends of the respective pipelines in the natural gas network and all natural gas flows $G_{i_c,u}^+$ at the head ends of the respective compressors at the sampling time point $\tau_u$; $x_{G^-,u}$ represents a column vector consisting of all natural gas flows $G_{i_p,u}^+$ at the tail ends of the respective pipelines in the natural gas network and all natural gas flows $G_{i_c,u}^-$ at the tail ends of the respective compressors at the sampling time point $\tau_u$; $x_{pr,u}$ represents a column vector consisting of all pressures $h_{i_n}$ of the respective nodes of the natural gas network at the sampling time point $\tau_u$; $x_{gs,u}$ represents a column vector consisting of all natural gas flows $G_{i_s,u}^{gs}$ of the respective natural gas sources in the natural gas network at the sampling time point $\tau_u$; and $x_{gl,u}$ represents a column vector consisting of all natural gas flows $G_{i_l,u}^{gl}$ of the respective natural gas loads in the natural gas network at the sampling time point $\tau_u$;

step 4 of establishing, based on the measurement vector constructed in the step 2 and the state vector constructed in the step 3, an objective function of the dynamic state estimation of the natural gas network as follows:

$$\min J = \sum_{u=0}^{I^e-1} \{[z_u - x_u]W^{-1}[z_u - x_u]^T\} + \sum_{u=I^e}^{I^f-1} \{[z_u - x_u]W^{-1}\delta^{u-I^e}[z_u - x_u]^T\}$$

where J represents an expression of the objective function; W represents a covariance matrix of a measurement error and is determined by the dispatcher of the natural gas network; a superscript T represents a matrix transpose; and $\delta$ represents a decay factor of a historical time window and is determined by the dispatcher of the natural gas network;

step 5 of establishing constraint conditions for the dynamic state estimation of the natural gas network, the step 5 including:

sub-step 5-1 of establishing constraints related to a flow and a pressure of the compressor in the natural gas network, the sub-step 5-1 including:

establishing a flow constraint of the head end and the tail end of a compressor:

$$G_{i_c,u}^+ = G_{i_c,u}^-, \forall i_c \in \Omega_c, \forall u=0,1,\ldots,I^f-1$$

where $\Omega_c$ represents a set of serial numbers of all the compressors in the natural gas network; and establishing a pressure constraint at the head end and the tail end of the compressor, wherein, for the compressor with a constant tail end pressure, the pressure constraint of the head end and the tail end of the compressor is as follows:

$$h_{i_c,u}^- = h_{i_c,con}^-, \forall i_c \in \Omega_{c,1}, \forall u=0,1,\ldots,I^f-1$$

where $h_{i_c,u}^-$ represents a tail end pressure of a compressor $i_c$ at the sampling time point $\tau_u$; $h_{i_c,con}^-$ represents a set value of a tail end pressure of the compressor $i_c$ and is a constant determined by the dispatcher of the natural gas network; and $\Omega_{c,1}$ represents a set of serial numbers of all the compressors with the constant tail end pressure in the natural gas network;

wherein, for a compressor with a constant compression ratio, the pressure constraint of the head end and the tail end of the compressor is as follows:

$$h_{i_c,u}^- = r_{i_c,con} \cdot h_{i_c,u}^-, \forall i_c \in \Omega_{c,2}, \forall u=0,1,\ldots,I^f-1$$

where $h_{i_c,u}^+$ represents a head end pressure of the compressor $i_c$ at the sampling time point $\tau_u$; $r_{i_c,con}$ represents a set value of a compression ratio of the compressor $i_c$ and is a constant determined by the dispatcher of the natural gas network; and $\Omega_{c,2}$ represents a set of serial numbers of all the compressors with the constant compression ratio in the natural gas network; and wherein, for a compressor with a constant pressure difference, the pressure constraint of the head end and the tail end of the compressor id as follows:

$$h_{i_c,u}^- - h_{i_c,u}^+ = \Delta h_{i_c,con}, \forall i_c \in \Omega_{c,3}, \forall u=0,1,\ldots,I^f-1$$

where $\Delta h_{i_c,con}$ represents a set value of a pressure difference between the tail end and the head end of the compressor $i_c$ and is a constant determined by the dispatcher of the natural gas network; and $\Phi_{c,3}$ represents a set of serial numbers of all the compressors with the constant pressure difference in the natural gas network;

sub-step 5-2 of establishing a flow constraint and a pressure constraint of the natural gas in the pipeline in the natural gas network, the sub-step 5-2 including:

establishing a two-port constraint of the pipeline in the natural gas network of each frequency component $\omega_d$ in the frequency-domain window:

$$\begin{bmatrix} h_{i_p,d}^- \\ G_{i_p,d}^- \end{bmatrix} = \begin{bmatrix} A_{i_p,d} & B_{i_p,d} \\ C_{i_p,d} & D_{i_p,d} \end{bmatrix} \begin{bmatrix} h_{i_p,d}^+ \\ G_{i_p,d}^+ \end{bmatrix}, \forall i_p \in \Omega_p, \forall d=0,1,\ldots,I^f-1$$

where $h_{i_p,d}^-$ represents a value of a d-th component of a tail end pressure of a pipeline $i_p$ in the natural gas network in a frequency-domain window $I^f$, and $h_{i_p,d}^-$ is a complex variable to be solved; $h_{i_p,d}^+$ represents a value of a d-th frequency component of a head end pressure of the pipeline $i_p$ in the natural gas network, and $h_{i_p,d}^+$ is a complex variable to be solved; $G_{i_p,d}^-$ represents a value of a d-th component of a natural gas flow at the tail end of the pipeline $i_p$ in the natural gas network in the frequency-domain window $l^f$, and $G_{i_p,d}^-$ is a complex variable to be solved; $G_{i_p,d}^+$ represents a value of a d-th component of a natural gas flow at the head end of the pipeline $i_p$ in the natural gas network in the frequency-domain window, and $G_{i_p,d}^+$ is a complex variable to be solved; and $A_{i_p,d}$, $B_{i_p,d}$, $C_{i_p,d}$ and $D_{i_p,d}$ represent two-port parameters of a d-th component of the pipeline $i_p$ in the natural gas network in the frequency-domain window, and values of $A_{i_p,d}$, $B_{i_p,d}$, $C_{i_p,d}$ and $D_{i_p,d}$ are respectively expressed as:

$$A_{i_p,d} = [\cosh(l_{i_p} \cdot a_{i_p,d}) - b_{i_p,d} \cdot \sinh(l_{i_p} \cdot a_{i_p,d})] \cdot e^{-\frac{k_{i_p} \cdot l_{i_p}}{2}}$$

$$B_{i_p,d} = -\frac{z_{i_p,d}}{\sqrt{(k_{i_p})^2 + 4 \cdot Z_{i_p,d} Y_{i_p,d}}} \sinh(l_{i_p} \cdot a_{i_p,d}) \cdot e^{-\frac{k_{i_p} \cdot l_{i_p}}{2}}$$

$$C_{i_p,d} = -\frac{Y_{i_p,d}}{\sqrt{(k_{i_p})^2 + 4 \cdot Z_{i_p,d} Y_{i_p,d}}} \sinh(l_{i_p} \cdot a_{i_p,d}) \cdot e^{-\frac{k_{i_p} \cdot l_{i_p}}{2}}$$

$$D_{i_p,d} = [\cosh(l_{i_p} \cdot a_{i_p,d}) + b_{i_p,d} \cdot \sinh(l_{i_p} \cdot a_{i_p,d})] \cdot e^{-\frac{k_{i_p} \cdot l_{i_p}}{2}}$$

where $l_{i_p}$ represents a length of the pipeline $i_p$ in the natural gas network, $k_{i_p}$, $a_{i_p,d}$, $b_{i_p,d}$, $Z_{i_p,d}$ and $Y_{i_p,d}$ represent values of the d-th frequency component of pipeline parameters of the natural gas network, and values of $k_{i_p}$, $a_{i_p,d}$, $b_{i_p,d}$, $Z_{i_p,d}$ and $Y_{i_p,d}$ are respectively expressed as:

$$k_{i_p} = -\frac{2gD_{i_p}\sin\theta_{i_p} - \lambda_{i_p}(v_{base,i_p})^2}{2RTD_{i_p}}$$

$$a_{i_p,d} = \frac{1}{2}\sqrt{(k_{i_p,d})^2 + 4Z_{i_p,d}Y_{i_p,d}}$$

$$b_{i_p,d} = \frac{k_{i_p,d}}{\sqrt{(k_{i_p,d})^2 + 4Z_{i_p,d}Y_{i_p,d}}}$$

$$Z_{i_p,d} = R_{i_p} + j\omega_d L_{i_p}$$

$$Y_{i_p,d} = j\omega_d C_{i_p}$$

where g represents an acceleration of gravity; $D_{i_p}$ represents an inner diameter of the pipeline $i_p$ in the natural gas network; $\theta_{i_p}$ represents an angle of inclination of the pipeline $i_p$ in the natural gas network; $\lambda_{i_p}$ represents a friction coefficient of the pipeline $i_p$ in the natural gas network; $v_{base,i_p}$ represents a basic value of a flow velocity in the pipeline $i_p$ in the natural gas network; R represents a gas constant of natural gas; T represents a temperature of the natural gas; j represents a complex number unit; and $R_{i_p}$, $L_{i_p}$ and $C_{i_p}$ are parameters of the natural gas network, and values of $R_{i_p}$, $L_{i_p}$ and $C_{i_p}$ are respectively expressed as:

$$R_{i_p} = \lambda_{i_p} v_{base,i_p}/(A_{i_p} D_{i_p})$$

$$L_{i_p} = 1/A_{i_p}$$

$$C_{i_p} = A_{i_p}/(RT)$$

where $A_{i_p}$ represents a cross-sectional area of the pipeline $i_p$ in the natural gas network;

establishing a time domain-frequency-domain mapping constraint of the natural gas flow at the head end of the pipeline of the natural gas network:

$$G_{i_p,u}^+ = \Sigma_{d=0}^{l^f-1}[\text{Re}(G_{i_p,d}^+)\cdot\cos(\theta_d-\omega_d\cdot u\Delta t) - \text{Im}(G_{i_p,d}^+)\cdot\sin(\theta_d-\omega_d\cdot u\Delta t)]$$

where Re( ) represents valuing a real part of a complex number; Im( ) represents valuing an imaginary part of the complex number; and $\theta_d$ represents a parameter calculated with $\omega_d$ as follows:

$$\theta_d = l^f \cdot \omega_d - \omega_d$$

establishing a time domain-frequency-domain mapping constraint of the natural gas flow at the tail end of the pipeline of the natural gas network:

$$G_{i_p,u}^- = \Sigma_{d=0}^{l^f-1}[\text{Re}(G_{i_p,d}^-)\cdot\cos(\theta_d-\omega_d\cdot u\Delta t) - \text{Im}(G_{i_p,d}^-)\cdot\sin(\theta_d-\omega_d\cdot u\Delta t)], \text{ and}$$

establishing a time domain-frequency-domain mapping constraint of the node of the natural gas network:

$$h_{i_n,u} = \Sigma_{d=0}^{l^f-1}[\text{Re}(h_{i_n,d})\cdot\cos(\theta_d-\omega_d\cdot u\Delta t) - \text{Im}(h_{i_n,d})\cdot\sin(\theta_d-\omega_d\cdot u\Delta t)]$$

where $h_{i_n,u}$ represents a value of a d-th component of a pressure of a node $i_n$ in the frequency-domain window; and $h_{i_n,u}$ represents a complex variable to be solved; and
sub-step 5-3 of establishing a topological constraint of the natural gas network, the sub-step 5-3 including:
establishing a flow balance constraint of a node of the natural gas network:

$$\sum_{i_p \in \Omega_p^{+,i_n}} G_{i_p,u}^+ - \sum_{i_p \in \Omega_p^{-,i_n}} G_{i_p,u}^- + \sum_{i_c \in \Omega_c^{+,i_n}} G_{i_c,u}^+ - \sum_{i_c \in \Omega_c^{-,i_n}} G_{i_c,u}^- + \sum_{i_l \in \Omega_l^{-,i_n}} G_{i_l,u}^{gl} - \sum_{i_s \in \Omega_s^{+,i_n}} G_{i_s,u}^{gs} = 0$$

where $\Omega_p^{+,i_n}$ represents a set of serial numbers of pipelines connected to the node $i_n$ at head ends; $\Omega_p^{-,i_n}$ represents a set of serial numbers of pipelines connected to the node $i_n$ at tail ends; $\Omega_c^{+,i_n}$ represents a set of serial numbers of compressors connected to the node $i_n$ at head ends; $\Omega_c^{-,i_n}$ represents a set of serial numbers of compressors connected to the node $i_n$ at tail ends; $\Omega_s^{+,i_n}$ represents a set of serial numbers of natural gas sources connected to the node $i_n$; and $\Omega_l^{-,i_n}$ represents a set of serial numbers of natural gas loads connected to the node $i_n$;
establishing constraints of a pipeline-compressor-node time-domain pressure relationship in the natural gas network:

$$h_{i_p,u}^+ = h_{i_n,u} \forall i_p \in \Omega_p^{+,i_n}$$

$$h_{i_p,u}^- = h_{i_n,u} \forall i_p \in \Omega_p^{-,i_n}$$

$$h_{i_c,u}^+ = h_{i_n,u} \forall i_c \in \Omega_c^{-,i_n}$$

$$h_{i_c,u}^- = h_{i_n,u} \forall i_c \in \Omega_c^{-,i_n}, \text{ and}$$

establishing constraints of a pipeline-node frequency-domain pressure relationship in the natural gas network:

$$h_{i_p,d}^+ = h_{i_n,d} \forall i_p \in \Omega_p^{-,i_n}$$

$$h_{i_p,d}^- = h_{i_n,d} \forall i_p \in \Omega_p^{-,i_n}, \text{ and}$$

step 6 of forming a dynamic state estimation model of the natural gas network by using the objective function of the dynamic state estimation of the natural gas network established in the step 4 and the constraint conditions for the dynamic state estimation of the natural gas network established in the step 5; solving, by using a Lagrange method or an interior point method, the dynamic state estimation model of the natural gas network, to obtain the state vector $x_u$ for the dynamic state estimation of the natural gas network at the sampling time point $\tau_u$; and performing the dynamic state estimation of the natural gas network by considering the dynamic characteristics of the natural gas pipelines.

The method provided by the present disclosure has the following advantages.

According to the present disclosure, the method for the dynamic state estimation of the natural gas network considering the dynamic characteristic of the natural gas pipeline can obtain a result of the dynamic state estimation of the natural gas network by establishing the objective function of the dynamic state estimation of the natural gas network, the state quantity constraint of the compressor, the state quantity constraint of the natural gas pipeline and the topological constraint of the natural gas network are established, and by using the Lagrange method or the interior point method to solve a state estimation model of the natural gas network. The method according to the present disclosure takes the topological constraint of the natural gas network into consideration, and employs a pipeline pressure constraint in a frequency domain to implement linearization of the pipeline pressure constraint, thereby obtaining a real-time, reliable, consistent and complete dynamic operating state of the natural gas network.

DESCRIPTION OF EMBODIMENTS

A method for a dynamic state estimation of a natural gas network considering dynamic characteristics of natural gas pipelines provided by the present disclosure includes the following steps (1) to (5).

(1) A time-domain window and a frequency-domain window for the dynamic state estimation of the natural gas network are established. The step (1) includes the following steps (1-1) to (1-2).

(1-1) A time-domain window width is defined as $I^t$, where $I^t$ is a positive integer, and a value of $I^t$ is determined by a dispatcher of the natural gas network. A u-th sampling time point in the time-domain window is defined as $\tau_u=\tau-u\Delta t$, $u=0, 1, \ldots, I^t-1$, where $\tau$ represents a current time point of the natural gas network, and $\Delta t$ represents a sampling interval of the natural gas network. A current time-domain window width is defined as $I^{t,e}$, where $I^{t,e}$ is a positive integer, and a value of $I^{t,e}$ is determined by the dispatcher of the natural gas network. A historical time-domain window width is defined as $I^{t,h}$, where $I^{t,h}$ is a positive integer. A value of $I^{t,h}$ is determined by the dispatcher of the natural gas network. $I^t$, $I^{t,e}$ and $I^{t,h}$ satisfy the following relational expression:

$$I^t = I^{t,e} + I^{t,h}.$$

(1-2) A frequency-domain window width is defined as $I^f$, where a value of $I^f$ is determined by the dispatcher of the natural gas network. A d-th frequency component in the frequency-domain window is defined as $\omega_d$, $d=0, 1, \ldots, I^f-1$, where $\omega_d$ is calculated by the following formula:

$$\omega_d = \frac{d}{I^t \cdot \Delta t}.$$

(2) A measurement vector for the dynamic state estimation of the natural gas network is constructed. The step (2) includes the following steps (2-1) to (2-1).

(2-1) All operation data of the natural gas network at a sampling time point $\tau_u$ in the time-domain window where the current time point T of the natural gas network belongs is acquired from a data acquisition and monitoring and control system of the natural gas network. The all operation data of the natural gas network includes: a measurement value $z_{G^+,u}^{i_p}$ of a natural gas flow at a head end of each pipeline in the natural gas network, and a measurement value $z_{G^-,u}^{i_p}$ of a natural gas flow at a tail end of each pipeline in the natural gas network, where $i_p$ represents a serial number of a pipeline in the natural gas network; a measurement value $z_{G^+,u}^{i_c}$ of a natural gas flow at a head end of each compressor, and a measurement value $z_{G^-,u}^{i_c}$ of a natural gas flow at a tail end of each compressor, where $i_c$ represents a serial number of a compressor; a pressure measurement value $z_{pr,u}^{i_n}$ of each node of the natural gas network, where $i_n$ represents a serial number of a node of the natural gas network; a measurement value $z_{gs,u}^{i_s}$ of a natural gas flow of each natural gas source, where $i_s$ represents a serial number of a natural gas source; and a measurement value $z_{gl,u}^{i_l}$ of a natural gas flow of each natural gas load, where $i_l$ represents a serial number of a natural gas load.

(2-2) A measurement vector $z_u$ for the dynamic state estimation of the natural gas network at each sampling time point $\tau_u$ is constructed:

$$z_u = \begin{bmatrix} z_{G^+,u} \\ z_{G^-,u} \\ z_{pr,u} \\ z_{gs,u} \\ z_{gl,u} \end{bmatrix},$$

where $z_{G^+,u}$ represents a column vector consisting of all the measurement values $z_{G^+,u}^{i_p}$ of natural gas flows at head ends of respective pipelines in the natural gas network and all the measurement values $z_{G^+,u}^{i_c}$ of natural gas flows at head ends of respective compressors at the sampling time point $\tau_u$; $z_{G^-,u}$ represents a column vector consisting of all the measurement values $z_{G^-,u}^{i_p}$ of natural gas flows at tail ends of respective pipelines in the natural gas network and all the measurement values $z_{G^-,u}^{i_c}$ of natural gas flows at tail ends of respective compressors at the sampling time point $\tau_u$; $z_{pr,u}$ represents a column vector consisting of all the pressure measurement values $z_{pr,u}^{i_n}$ of respective nodes of the natural gas network at the sampling time point $\tau_u$; $z_{gs,u}$ represents a column vector consisting of all the measurement values $z_{gs,u}^{i_s}$ of natural gas flows of respective natural gas sources in the natural gas network at the sampling time point $\tau_u$; and $z_{gl,u}$ represents a column vector consisting of all the measurement values $z_{gl,u}^{i_l}$ of natural gas flows of respective natural gas loads in the natural gas network at the sampling time point $\tau_u$.

(3) A state vector $x_u$ for the dynamic state estimation of the natural gas network at each sampling time point $\tau_u$ is constructed:

$$x_u = \begin{bmatrix} x_{G^+,u} \\ x_{G^-,u} \\ x_{pr,u} \\ x_{gs,u} \\ x_{gl,u} \end{bmatrix},$$

where $x_{G^+,u}$ represents a column vector consisting of all natural gas flows $G_{i_p,u}^+$ at the head ends of the respective pipelines in the natural gas network and all natural gas flows $G_{i_c,u}^+$ at the head ends of the respective compressors at the sampling time point $\tau_u$; $x_{G^-,u}$ represents a column vector consisting of all natural gas flows $G_{i_p,u}^-$ at the tail ends of the respective pipelines in the natural gas network and all natural gas flows $G_{i_c,u}^-$ at the tail ends of the respective compressors at the sampling time point $\tau_u$; $x_{pr,u}$ represents a column vector consisting of all pressures $h_{i_n}$ of the respective nodes of the natural gas network at the sampling time point $\tau_u$; $x_{gs,u}$ represents a column vector consisting of all natural gas flows $G_{i_s,u}^{gs}$ of the respective natural gas sources in the natural gas network at the sampling time point $\tau_u$; and $x_{gl,u}$ represents a column vector consisting of all natural gas flows $G_{i_l,u}^{gl}$ of the respective natural gas loads in the natural gas network at the sampling time point $\tau_u$.

(4) An objective function of the dynamic state estimation of the natural gas network is established based on the measurement vector constructed in step (2) and the state vector constructed in step (3):

$$\min J = \Sigma_{u=0}^{I^e-1} \{[z_u - x_u] W^{-1} [z_u - x_u]^T\} + \Sigma_{u=I^e}^{I^f-1} \{[z_u - x_u] W^{-1} \delta^{u-I^e} [z_u - x_u]^T\},$$

where J represents an expression of the objective function; W represents a covariance matrix of a measurement error and is determined by the dispatcher of the natural gas network; a superscript T represents a matrix transpose; and $\delta$ represents a decay factor of a historical time window and is determined by the dispatcher of the natural gas network.

(5) Constraint conditions for the dynamic state estimation of the natural gas network are established. The step (5) includes steps (5-1) to (5-3).

(5-1) Constraints related to a flow and a pressure of a compressor in the natural gas network are established. The step (5-1) includes steps (5-1-1) to (5-1-2).

(5-1-1) A flow constraint at a head end and a tail end of a compressor is established:

$$G_{i_c,u}^+ = G_{i_c,u}^-, \forall i_c \in \Omega_c, \forall u = 0, 1, \ldots, I^f - 1$$

where $\Omega_c$ represents a set of serial numbers of respective compressors in the natural gas network.

(5-1-2) A pressure constraint at a head end and a tail end of a compressor is established.

For a compressor with a constant tail end pressure, the pressure constraint at the head end and the tail end of the compressor being as follows:

$$h_{i_c,u}^- = h_{i_c,con}^-, \forall i_c \in \Omega_{c,1}, \forall u = 0, 1, \ldots, I^f - 1$$

where $h_{i_c,u}^-$ represents a tail end pressure of a compressor $i_c$ at the sampling time point $\tau_u$, $h_{i_c,con}^-$ represents a set value of the tail end pressure of the compressor $i_c$, is a constant, and is determined by the dispatcher of the natural gas network, and $\Omega_{c,1}$ represents a set of serial numbers of respective compressors with the constant tail end pressure in the natural gas network.

For a compressor with a constant compression ratio, the pressure constraint of the head end and the tail end of the compressor is as follows:

$$h_{i_c,u}^- = r_{i_c,con} \cdot h_{i_c,u}^-, \forall i_c \in \Omega_{c,2}, \forall u = 0, 1, \ldots, I^f - 1$$

where $h_{i_c,u}^+$ represents a head end pressure of the compressor $i_c$ at the sampling time point $\tau_u$; $r_{i_c,con}$ represents a set value of a compression ratio of the compressor $i_c$ and is a constant determined by the dispatcher of the natural gas network; and $\Omega_{c,2}$ represents a set of serial numbers of all the compressors with the constant compression ratio in the natural gas network.

For a compressor with a constant pressure difference, the pressure constraint of the head end and the tail end of the compressor is as follows:

$$h_{i_c,u}^- - h_{i_c,u}^+ = \Delta h_{i_c,con}, \forall i_c \in \Omega_{c,3}, \forall u = 0, 1, \ldots, I^f - 1$$

where $\Delta h_{i_c,con}$ represents a set value of a pressure difference between the tail end and the head end of the compressor $i_c$ and is a constant determined by the dispatcher of the natural gas network; and $\Phi_{c,3}$ represents a set of serial numbers of all the compressors with the constant pressure difference in the natural gas network.

(5-2) A flow constraint and a pressure constraint of natural gas in a pipeline in the natural gas network are established. The step (5-2) includes steps (5-2-1) to (5-2-5).

(5-2-1) A two-port constraint of the pipeline in the natural gas network of each frequency component $\omega_d$ in the frequency-domain window is established:

$$\begin{bmatrix} h_{i_p,d}^- \\ G_{i_p,d}^- \end{bmatrix} = \begin{bmatrix} A_{i_p,d} & B_{i_p,d} \\ C_{i_p,d} & D_{i_p,d} \end{bmatrix} \begin{bmatrix} h_{i_p,d}^+ \\ G_{i_p,d}^+ \end{bmatrix},$$

$$\forall i_p \in \Omega_p,$$

$$\forall d = 0, 1, \ldots, I^f - 1,$$

where $h_{i_p,d}^-$ represents a value of a d-th component of a tail end pressure of a pipeline $i_p$ in the natural gas network in a frequency-domain window $I^f$, and $h_{i_p,d}^-$ is a complex variable to be solved; $h_{i_p,d}^+$ represents a value of a d-th frequency component of a head end pressure of the pipeline $i_p$ in the natural gas network, and $h_{i_p,d}^+$ is a complex variable to be solved; $G_{i_p,d}^-$ represents a value of a d-th component of a natural gas flow at the tail end of the pipeline $i_p$ in the natural gas network in the frequency-domain window $I^f$, and $G_{i_p,d}^-$ is a complex variable to be solved; $G_{i_p,d}^+$ represents a value of a d-th component of a natural gas flow at the head end of the pipeline $i_p$ in the natural gas network in the frequency-domain window, and $G_{i_p,d}^-$ is a complex variable to be solved; and $A_{i_p,d}$, $B_{i_p,d}$, $C_{i_p,d}$ and $D_{i_p,d}$ represent two-port parameters of a d-th component of the pipeline $i_p$ in the natural gas network in the frequency-domain window, and values of $A_{i_p,d}$, $B_{i_p,d}$, $C_{i_p,d}$ and $D_{i_p,d}$ are respectively expressed as:

$$A_{i_p,d} = [\cosh(l_{i_p} \cdot a_{i_p,d}) - b_{i_p,d} \cdot \sinh(l_{i_p} \cdot a_{i_p,d})] \cdot e^{-\frac{k_{i_p} \cdot l_{i_p}}{2}}$$

$$B_{i_p,d} = -\frac{Z_{i_p,d}}{\sqrt{(k_{i_p})^2 + 4 \cdot Z_{i_p,d} Y_{i_p,d}}} \sinh(l_{i_p} \cdot a_{i_p,d}) \cdot e^{-\frac{k_{i_p} \cdot l_{i_p}}{2}}$$

-continued $$C_{i_p,d} = -\frac{Y_{i_p,d}}{\sqrt{(k_{i_p})^2 + 4 \cdot Z_{i_p,d} Y_{i_p,d}}} \sinh(l_{i_p} \cdot a_{i_p,d}) \cdot e^{-\frac{k_{i_p} \cdot l_{i_p}}{2}}$$

$$D_{i_p,d} = [\cosh(l_{i_p} \cdot a_{i_p,d}) - b_{i_p,d} \cdot \sinh(l_{i_p} \cdot a_{i_p,d})] \cdot e^{-\frac{k_{i_p} \cdot l_{i_p}}{2}},$$

where $l_{i_p}$ represents a length of the pipeline $i_p$ in the natural gas network, $k_{i_p}$, $a_{i_p,d}$, $b_{i_p,d}$, $Z_{i_p,d}$ and $Y_{i_p,d}$ represent values of the d-th frequency component of pipeline parameters of the natural gas network, and values of $k_{i_p}$, $a_{i_p,d}$, $b_{i_p,d}$, $Z_{i_p,d}$ and $Y_{i_p,d}$ are respectively expressed as:

$$k_{i_p} = -\frac{2gD_{i_p}\sin\theta_{i_p} - \lambda_{i_p}(v_{base,i_p})^2}{2RTD_{i_p}}$$

$$a_{i_p,d} = \frac{1}{2}\sqrt{(k_{i_p,d})^2 + 4Z_{i_p,d}Y_{i_p,d}}$$

$$b_{i_p,d} = \frac{k_{i_p,d}}{\sqrt{(k_{i_p,d})^2 + 4Z_{i_p,d}Y_{i_p,d}}}$$

$$Z_{i_p,d} = R_{i_p} + j\omega_d L_{i_p}$$

$$Y_{i_p,d} = j\omega_d C_{i_p}$$

where g represents an acceleration of gravity; $D_{i_p}$ represents an inner diameter of the pipeline $i_p$ in the natural gas network; $\theta_{i_p}$ represents an angle of inclination of the pipeline $i_p$ in the natural gas network; $\lambda_{i_p}$ represents a friction coefficient of the pipeline $i_p$ in the natural gas network; $v_{base,i_p}$ represents a basic value of a flow velocity in the pipeline $i_p$ in the natural gas network; R represents a gas constant of natural gas; T represents a temperature of the natural gas; j represents a complex number unit; and $R_{i_p}$, $L_{i_p}$ and $C_{i_p}$ are parameters of the natural gas network, and values of $R_{i_p}$, $L_{i_p}$ and $C_{i_p}$ are respectively expressed as:

$$R_{i_p} = \lambda_{i_p} v_{base,i_p}/(A_{i_p} D_{i_p})$$

$$L_{i_p} = 1/A_{i_p}$$

$$C_{i_p} = A_{i_p}/(RT)$$

where $A_{i_p}$ represents a cross-sectional area of the pipeline $i_p$ in the natural gas network.

(5-2-3) A time domain-frequency-domain mapping constraint of the natural gas flow at the head end of the pipeline of the natural gas network is established:

$$G_{i_p,u}^+ = \Sigma_{d=0}^{f-1}[\text{Re}(G_{i_p,d}^+) \cdot \cos(\theta_d - \omega_d \cdot u\Delta t) - \text{Im}(G_{i_p,d}^+) \cdot \sin(\theta_d - \omega_d \cdot u\Delta t)],$$

where Re( ) represents valuing a real part of a complex number; Im( ) represents valuing an imaginary part of the complex number; and $\theta_d$ represents a parameter calculated with $\omega_d$ as follows:

$$\theta_d = f \cdot \omega_d \cdot \omega_d.$$

(5-2-4) A time domain-frequency-domain mapping constraint of the natural gas flow at the tail end of the pipeline of the natural gas network is established:

$$G_{i_p,u}^- = \Sigma_{d=0}^{f-1}[\text{Re}(G_{i_p,d}^-) \cdot \cos(\theta_d - \omega_d \cdot u\Delta t) - \text{Im}(G_{i_p,d}^-) \cdot \sin(\theta_d - \omega_d \cdot u\Delta t)].$$

(5-2-5) A time domain-frequency-domain mapping constraint of nodes of the natural gas network is established:

$$h_{i_n,u} = \Sigma_{d=0}^{f-1}[\text{Re}(h_{i_n,d}) \cdot \cos(\theta_d - \omega_d \cdot u\Delta t) - \text{Im}(h_{i_b,d}) \cdot \sin(\theta_d - \omega_d \cdot u\Delta t)],$$

where $h_{i_n,u}$ represents a value of a d-th component of a pressure of a node $i_n$ in the frequency-domain window; and $h_{i_n,u}$ represents a complex variable to be solved.

(5-3) A topological constraint of the natural gas network is established. The step (5-3) includes steps (5-3-1) to (5-3-3).

(5-3-1) A flow balance constraint of a node of the natural gas network is established:

$$\sum_{i_p \in \Omega_p^{+,i_n}} G_{i_p,u}^+ - \sum_{i_p \in \Omega_p^{-,i_n}} G_{i_p,u}^- + \sum_{i_c \in \Omega_c^{+,i_n}} G_{i_c,u}^+ - \sum_{i_c \in \Omega_c^{-,i_n}} G_{i_c,u}^- + \sum_{i_l \in \Omega_l^{-,i_n}} G_{i_l,u}^{gl} - \sum_{i_s \in \Omega_s^{+,i_n}} G_{i_s,u}^{gs} = 0,$$

where $\Omega_p^{+,i_n}$ represents a set of serial numbers of pipelines connected to the node $i_n$ at head ends; $\Omega_p^{-,i_n}$ represents a set of serial numbers of pipelines connected to the node $i_n$ at tail ends; $\Omega_c^{+,i_n}$ represents a set of serial numbers of compressors connected to the node $i_n$ at head ends; $\Omega_c^{-,i_n}$ represents a set of serial numbers of compressors connected to the node $i_n$ at tail ends; $\Omega_s^{+,i_n}$ represents a set of serial numbers of natural gas sources connected to the node $i_n$; and $\Omega_l^{-,i_n}$ represents a set of serial numbers of natural gas loads connected to the node $i_n$.

(5-3-2) Constraints of a pipeline-compressor-node time-domain pressure relationship in the natural gas network are established:

$$h_{i_p,u}^+ = h_{i_n,u} \forall i_p \in \Omega_p^{+,i_n}$$

$$h_{i_p,u}^- = h_{i_n,u} \forall i_p \in \Omega_p^{-,i_n}$$

$$h_{i_c,u}^+ = h_{i_n,u} \forall i_c \in \Omega_c^{-,i_n}$$

$$h_{i_c,u}^- = h_{i_n,u} \forall i_c \in \Omega_c^{-,i_n}.$$

(5-3-3) Constraints of a pipeline-node frequency-domain pressure relationship in the natural gas network are established:

$$h_{i_p,d}^+ = h_{i_n,d} \forall i_p \in \Omega_p^{-,i_n}$$

$$h_{i_p,d}^- = h_{i_n,d} \forall i_p \in \Omega_p^{-,i_n}.$$

(6) A dynamic state estimation model of the natural gas network is formed by using the objective function of the dynamic state estimation of the natural gas network established in step (4) and the constraint conditions for the dynamic state estimation of the natural gas network established in step (5). The dynamic state estimation model of the natural gas network is solved by using a Lagrange method or an interior point method, to obtain the state vector $x_u$ for the dynamic state estimation of the natural gas network at each sampling time point $\tau_u$. Consequently, the dynamic state estimation of the natural gas network considering the dynamic characteristic of the natural gas pipeline is implemented.

In the embodiments of the present disclosure, commercial software Gurobi or Cplex is used to solve the dynamic state estimation model of the natural gas network.

What is claimed is:

1. A method for a dynamic state estimation of a natural gas network considering dynamic characteristics of natural gas pipelines to obtain a real-time, reliable and complete operating state of the natural gas network, the method comprising:

step 1 of establishing a time-domain window and a frequency-domain window for the dynamic state estimation of the natural gas network, the step 1 comprising:

sub-step 1-1 of defining a time-domain window width as $I^t$, where $I^t$ is a positive integer, and a value of $I^t$ is determined by a dispatcher of the natural gas network; defining a u-th sampling time point in the time-domain window as $\tau_u = \tau - u\Delta t$, $u = 0, 1, \ldots, I^t - 1$, where $\tau$ represents a current time point of the natural gas network, and $\Delta t$ represents a sampling interval of the natural gas network; defining a current time-domain window width as $I^{t,e}$, where $I^{t,e}$ is a positive integer, and a value of $I^{t,e}$ is determined by the dispatcher of the natural gas network; and defining a historical time-domain window width as $I^{t,h}$ where $I^{t,h}$ is a positive integer, and a value of $I^{t,h}$ is determined by the dispatcher of the natural gas network, wherein $I^t$, $I^{t,e}$ and $I^{t,h}$ satisfy the following relational expression:

$$I^t = I^{t,e} + I^{t,h}; \text{ and}$$

sub-step 1-2 of defining a frequency-domain window width as $I^f$, where a value of $I^f$ is determined by the dispatcher of the natural gas network; and defining a d-th frequency component in the frequency-domain window as $\omega_d$, $d = 0, 1, \ldots, I^f - 1$, where $\omega_d$ is calculated by the following formula:

$$\omega_d = \frac{d}{I^t \cdot \Delta t}.$$

step 2 of constructing a measurement vector for the dynamic state estimation of the natural gas network, the step 2 comprising:

sub-step 2-1 of acquiring, from a data acquisition and monitoring control system of the natural gas network, all operation data of the natural gas network at a sampling time point $\tau_u$ in the time-domain window where the current time point $\tau$ of the natural gas network belongs, wherein the all operation data of the natural gas network comprises: a measurement value $z_{G^+,u}^{i_p}$ of a natural gas flow at a head end of each pipeline in the natural gas network, and a measurement value $z_{G^-,u}^{i_p}$ of a natural gas flow at a tail end of each pipeline in the natural gas network, where $i_p$ represents a serial number of a pipeline in the natural gas network; a measurement value $z_{G^+,u}^{i_c}$ of a natural gas flow at a head end of each compressor, and a measurement value $z_{G^-,u}^{i_c}$ of a natural gas flow at a tail end of each compressor, where $i_c$ represents a serial number of a compressor; a pressure measurement value $z_{pr,u}^{i_n}$ of each node of the natural gas network, where $i_n$ represents a serial number of a node of the natural gas network; a measurement value $z_{gs,u}^{i_s}$ of a natural gas flow of each natural gas source, where $i_s$ represents a serial number of a natural gas source; and a measurement value $z_{gl,u}^{i_l}$ of a natural gas flow of each natural gas load, where $i_l$ represents a serial number of a natural gas load; and sub-step 2-2 of constructing a measurement vector $z_u$ for the dynamic state estimation of the natural gas network at the sampling time point $\tau_u$:

$$z_u = \begin{bmatrix} z_{G^+,u} \\ z_{G^-,u} \\ z_{pr,u} \\ z_{gs,u} \\ z_{gl,u} \end{bmatrix},$$

where $z_{G^+,u}$ represents a column vector consisting of all the measurement values $z_{G^+,u}^{i_p}$ of natural gas flows at head ends of respective pipelines in the natural gas network and all the measurement values $z_{G^+,u}^{i_c}$ of natural gas flows at head ends of respective compressors at the sampling time point $\tau_u$; $z_{G^-,u}$ represents a column vector consisting of all the measurement values $z_{G^-,u}^{i_p}$ of natural gas flows at tail ends of respective pipelines in the natural gas network and all the measurement values $z_{G^-,u}^{i_c}$ of natural gas flows at tail ends of respective compressors at the sampling time point $\tau_u$; $z_{pr,u}$ represents a column vector consisting of all the pressure measurement values $z_{pr,u}^{i_n}$ of respective nodes of the natural gas network at the sampling time point $\tau_u$; $z_{gs,u}$ represents a column vector consisting of all the measurement values $z_{gs,u}^{i_s}$ of natural gas flows of respective natural gas sources in the natural gas network at the sampling time point $\tau_u$; and $z_{gl,u}$ represents a column vector consisting of all the measurement values $z_{gl,u}^{i_l}$ of natural gas flows of respective natural gas loads in the natural gas network at the sampling time point $\tau_u$;

step 3 of constructing a state vector $x_u$ for the dynamic state estimation of the natural gas network at the sampling time point $\tau_u$:

$$x_u = \begin{bmatrix} x_{G^+,u} \\ x_{G^-,u} \\ x_{pr,u} \\ x_{gs,u} \\ x_{gl,u} \end{bmatrix},$$

where $x_{G^+,u}$ represents a column vector consisting of all natural gas flows $G_{i_p,u}^+$ at the head ends of the respective pipelines in the natural gas network and all natural gas flows $G_{i_c,u}^+$ at the head ends of the respective compressors at the sampling time point $\tau_u$; $x_{G^-,u}$ represents a column vector consisting of all natural gas flows $G_{i_p,u}^-$ at the tail ends of the respective pipelines in the natural gas network and all natural gas flows $G_{i_c,u}^-$ at the tail ends of the respective compressors at the sampling time point $\tau_u$; $x_{pr,u}$ represents a column vector consisting of all pressures $h_{i_n}$ of the respective nodes of the natural gas network at the sampling time point $\tau_u$; $x_{gs,u}$ represents a column vector consisting of all natural gas flows $G_{i_s,u}^{gs}$ of the respective natural gas sources in the natural gas network at the sampling time point $\tau_u$; and $x_{gl,u}$ represents a column vector consisting of all natural gas flows $G_{i_l,u}^{gl}$ of the respective natural gas loads in the natural gas network at the sampling time point $\tau_u$;

step 4 of establishing, based on the measurement vector constructed in the step 2 and the state vector constructed in the step 3, an objective function of the dynamic state estimation of the natural gas network as follows:

$$\min J = \Sigma_{u=0}^{I^e-1}\{[z_u - x_u]W^{-1}[z_u - x_u]^T\} + \Sigma_{u=I^e}^{I^f-1}\{[z_u - x_u]W^{-1}\delta^{u-I^e}[z_u - x_u]^T\},$$

where J represents an expression of the objective function; W represents a covariance matrix of a measurement error and is determined by the dispatcher of the natural gas network; a superscript T represents a matrix transpose; and δ represents a decay factor of a historical time window and is determined by the dispatcher of the natural gas network;

step 5 of establishing constraint conditions for the dynamic state estimation of the natural gas network, the step 5 comprising:
  sub-step 5-1 of establishing constraints related to a flow and a pressure of the compressor in the natural gas network, the sub-step 5-1 comprising:
    establishing a flow constraint of the head end and the tail end of a compressor:

$$G_{i_c,u}^+ = G_{i_c,u}^-, \forall i_c \in \Omega_c, \forall u = 0, 1, \ldots, I^f - 1,$$

where $\Omega_c$ represents a set of serial numbers of all the compressors in the natural gas network; and
  establishing a pressure constraint at the head end and the tail end of the compressor, wherein, for the compressor with a constant tail end pressure, the pressure constraint of the head end and the tail end of the compressor is as follows:

$$h_{i_c,u}^- = h_{i_c,con}^-, \forall i_c \in \Omega_{c,1}, \forall u = 0, 1, \ldots, I^f - 1,$$

where $h_{i_c,u}^-$ represents a tail end pressure of a compressor $i_c$ at the sampling time point $\tau_u$; $h_{i_c,con}^-$ represents a set value of a tail end pressure of the compressor $i_c$ and is a constant determined by the dispatcher of the natural gas network; and $\Omega_{c,1}$ represents a set of serial numbers of all the compressors with the constant tail end pressure in the natural gas network;

wherein, for a compressor with a constant compression ratio, the pressure constraint of the head end and the tail end of the compressor is as follows:

$$h_{i_c,u}^- = r_{i_c,con} \cdot h_{i_c,u}^+, \forall i_c \in \Omega_{c,2}, \forall u = 0, 1, \ldots, I^f - 1,$$

where $h_{i_c,u}^+$ represents a head end pressure of the compressor $i_c$ at the sampling time point $\tau_u$; $r_{i_c,con}$ represents a set value of a compression ratio of the compressor $i_c$ and is a constant determined by the dispatcher of the natural gas network; and $\Omega_{c,2}$ represents a set of serial numbers of all the compressors with the constant compression ratio in the natural gas network; and wherein, for a compressor with a constant pressure difference, the pressure constraint of the head end and the tail end of the compressor is as follows:

$$h_{i_c,u}^- - h_{i_c,u}^+ = \Delta h_{i_c,con}, \forall i_c \in \Omega_{c,3}, \forall u = 0, 1, \ldots, I^f - 1,$$

where $\Delta h_{i_c,con}$ represents a set value of a pressure difference between the tail end and the head end of the compressor $i_c$ and is a constant determined by the dispatcher of the natural gas network; and $\psi_{c,3}$ represents a set of serial numbers of all the compressors with the constant pressure difference in the natural gas network;

sub-step 5-2 of establishing a flow constraint and a pressure constraint of the natural gas in the pipeline in the natural gas network, the sub-step 5-2 comprising:

establishing a two-port constraint of the pipeline in the natural gas network of each frequency component $\omega_d$ in the frequency-domain window:

$$\begin{bmatrix} h_{i_p,d}^- \\ G_{i_p,d}^- \end{bmatrix} = \begin{bmatrix} A_{i_p,d} & B_{i_p,d} \\ C_{i_p,d} & D_{i_p,d} \end{bmatrix} \begin{bmatrix} h_{i_p,d}^+ \\ G_{i_p,d}^+ \end{bmatrix},$$

$$\forall i_p \in \Omega_p,$$

$$\forall d = 0, 1, \ldots, I^f - 1,$$

where $h_{i_p,d}^-$ represents a value of a d-th component of a tail end pressure of a pipeline $i_p$ in the natural gas network in a frequency-domain window $I^f$, and $h_{i_p,d}^-$ is a complex variable to be solved; $h_{i_p,d}^+$ represents a value of a d-th frequency component of a head end pressure of the pipeline $i_p$ in the natural gas network, and $h_{i_p,d}^+$ is a complex variable to be solved; $G_{i_p,d}^-$ represents a value of a d-th component of a natural gas flow at the tail end of the pipeline $i_p$ in the natural gas network in the frequency-domain window $I^f$, and $G_{i_p,d}^-$ is a complex variable to be solved; $G_{i_p,d}^+$ represents a value of a d-th component of a natural gas flow at the head end of the pipeline $i_p$ in the natural gas network in the frequency-domain window, and $G_{i_p,d}^+$ is a complex variable to be solved; and $A_{i_p,d}$, $B_{i_p,d}$, $C_{i_p,d}$ and $D_{i_p,d}$ represent two-port parameters of a d-th component of the pipeline $i_p$ in the natural gas network in the frequency-domain window, and values of $A_{i_p,d}$, $B_{i_p,d}$, $C_{i_p,d}$ and $D_{i_p,d}$ are respectively expressed as:

$$A_{i_p,d} = [\cosh(l_{i_p} \cdot a_{i_p,d}) - b_{i_p,d} \cdot \sinh(l_{i_p} \cdot a_{i_p,d})] \cdot e^{-\frac{k_{i_p} \cdot l_{i_p}}{2}}$$

$$B_{i_p,d} = -\frac{Z_{i_p,d}}{\sqrt{(k_{i_p})^2 + 4 \cdot Z_{i_p,d} Y_{i_p,d}}} \sinh(l_{i_p} \cdot a_{i_p,d}) \cdot e^{-\frac{k_{i_p} \cdot l_{i_p}}{2}}$$

$$C_{i_p,d} = -\frac{Y_{i_p,d}}{\sqrt{(k_{i_p})^2 + 4 \cdot Z_{i_p,d} Y_{i_p,d}}} \sinh(l_{i_p} \cdot a_{i_p,d}) \cdot e^{-\frac{k_{i_p} \cdot l_{i_p}}{2}}$$

$$D_{i_p,d} = [\cosh(l_{i_p} \cdot a_{i_p,d}) - b_{i_p,d} \cdot \sinh(l_{i_p} \cdot a_{i_p,d})] \cdot e^{-\frac{k_{i_p} \cdot l_{i_p}}{2}},$$

where $l_{i_p}$ represents a length of the pipeline $i_p$ in the natural gas network, $k_{i_p}$, $a_{i_p,d}$, $b_{i_p,d}$, $Z_{i_p,d}$ and $Y_{i_p,d}$ represent values of the d-th frequency component of pipeline parameters of the natural gas network, and values of $k_{i_p}$, $a_{i_p,d}$, $b_{i_p,d}$, $Z_{i_p,d}$ and $Y_{i_p,d}$ are respectively expressed as:

$$k_{i_p} = -\frac{2gD_{i_p}\sin\theta_{i_p} - \lambda_{i_p}(v_{base,i_p})^2}{2RTD_{i_p}}$$

$$a_{i_p,d} = \frac{1}{2}\sqrt{(k_{i_p,d})^2 + 4Z_{i_p,d}Y_{i_p,d}}$$

$$b_{i_p,d} = \frac{k_{i_p,d}}{\sqrt{(k_{i_p,d})^2 + 4Z_{i_p,d}Y_{i_p,d}}}$$

$$Z_{i_p,d} = R_{i_p} + j\omega_d L_{i_p}$$

$$Y_{i_p,d} = j\omega_d C_{i_p}$$

where g represents an acceleration of gravity; $D_{i_p}$ represents an inner diameter of the pipeline $i_p$ in the natural gas network; $\theta_{i_p}$ represents an angle of inclination of the pipeline $i_p$ in the natural gas network; $\lambda_{i_p}$ represents a friction coefficient of the pipeline $i_p$ $i_n$ the natural gas network; $v_{base,i_p}$ represents a basic value of a flow velocity in the pipeline $i_p$ in the natural gas network; R represents a gas constant of natural gas; T represents a temperature of the natural gas; j represents a complex number unit; and $R_{i_p}$, $L_{i_p}$ and $C_{i_p}$ are parameters of the natural gas network, and values of $R_{i_p}$, $L_{i_p}$ and $C_{i_p}$ are respectively expressed as:

$R_{i_p} = \lambda_{i_p} v_{base,i_p}/(A_{i_p} D_{i_p})$ $L_{i_p} = 1/A_{i_p}$ $C_{i_p} = A_{i_p}/(RT)$, where $A_{i_p}$ represents a cross-sectional area of the pipeline $i_p$ in the natural gas network;

establishing a time domain-frequency-domain mapping constraint of the natural gas flow at the head end of the pipeline of the natural gas network:

$G_{i_p,u}{}^+ = \Sum_{d=0}^{t^f-1}[\text{Re}(G_{i_p,d}{}^+) \cdot \cos(\theta_d - \omega_d \cdot u\Delta t) - \text{Im}(G_{i_p,d}{}^+) \cdot \sin(\theta_d - \omega_d \cdot u\Delta t)]$, where Re( ) represents valuing a real part of a complex number; Im( ) represents valuing an imaginary part of the complex number; and Od represents a parameter calculated with $\omega_d$ as follows:

$\theta_d = t^f \omega_d - \omega_d$;

establishing a time domain-frequency-domain mapping constraint of the natural gas flow at the tail end of the pipeline of the natural gas network:

$G_{i_p,u}{}^- = \Sum_{d=0}^{t^f-1}[\text{Re}(G_{i_p,d}{}^-) \cdot \cos(\theta_d - \omega_d \cdot u\Delta t) - \text{Im}(G_{i_p,d}{}^-) \cdot \sin(\theta_d - \omega_d \cdot u\Delta t)]$; and establishing a time domain-frequency-domain mapping constraint of the node of the natural gas network:

$$h_{i_n,u} = \sum_{d=0}^{t^f-1} [\text{Re}(h_{i_n,d}) \cdot \cos(\theta_d - \omega_d \cdot u\Delta t) - \text{Im}(h_{i_n,d}) \cdot \sin(\theta_d - \omega_d \cdot u\Delta t)]$$

where $h_{i_n,u}$ represents a value of a d-th component of a pressure of a node $i_n$ in the frequency-domain window; and $h_{i_n,u}$ represents a complex variable to be solved; and sub-step 5-3 of establishing a topological constraint of the natural gas network, the sub-step 5-3 comprising: establishing a flow balance constraint of a node of the natural gas network:

$$\sum_{i_p \in \Omega_p^{+,i_n}} G_{i_p,u}^+ - \sum_{i_p \in \Omega_p^{-,i_n}} G_{i_p,u}^- + \sum_{i_c \in \Omega_c^{+,i_n}} G_{i_c,u}^+ - \sum_{i_c \in \Omega_c^{-,i_n}} G_{i_c,u}^- + \sum_{i_l \in \Omega_l^{-,i_n}} G_{i_l,u}^{gl} - \sum_{i_s \in \Omega_s^{+,i_n}} G_{i_s,u}^{gs} = 0$$

where $\Omega_p^{+,i_n}$ represents a set of serial numbers of pipelines connected to the node $i_n$ at head ends; $\Omega_p^{-,i_n}$ represents a set of serial numbers of pipelines connected to the node $i_n$ at tail ends; $\Omega_c^{+,i_n}$ represents a set of serial numbers of compressors connected to the node in at head ends; $\Omega_c^{-,i_n}$ represents a set of serial numbers of compressors connected to the node $i_n$ at tail ends; $\Omega_s^{+,i_n}$ represents a set of serial numbers of natural gas sources connected to the node $i_n$; and $\Omega_l^{-,i_n}$ represents a set of serial numbers of natural gas loads connected to the node $i_n$;

establishing constraints of a pipeline-compressor-node time-domain pressure relationship in the natural gas network:

$h_{i_p,u}{}^+ = h_{i_n,u}, \forall i_p \in \Omega_p^{+,i_n}$ $h_{i_p,u}{}^- = h_{i_n,u}, \forall i_p \in \Omega_p^{-,i_n}$ $h_{i_c,u}{}^+ = h_{i_n,u}, \forall i_c \in \Omega_c^{-,i_n}$ $h_{i_c,u}{}^- = h_{i_n,u}, \forall i_c \in \Omega_c^{-,i_n}$; and establishing constraints of a pipeline-node frequency-domain pressure relationship in the natural gas network:

$h_{i_p,d}{}^+ = h_{i_n,d}, \forall i_p \in \Omega_p^{+,i_n}$ $h_{i_p,d}{}^- = h_{i_n,d}, \forall i_p \in \Omega_p^{-,i_n}$; and step 6 of forming a dynamic state estimation model of the natural gas network by using the objective function of the dynamic state estimation of the natural gas network established in the step 4 and the constraint conditions for the dynamic state estimation of the natural gas network established in the step 5; solving, by using a Lagrange method or an interior point method, the dynamic state estimation model of the natural gas network, to obtain the state vector $x_u$ for the dynamic state estimation of the natural gas network at the sampling time point $\tau_u$; and performing the dynamic state estimation of the natural gas network by considering the dynamic characteristics of the natural gas pipelines to provide sufficient data support for operation and control of an integrated energy system.

* * * * *